United States Patent
Schantz et al.

(10) Patent No.: US 8,436,780 B2
(45) Date of Patent: May 7, 2013

(54) PLANAR LOOP ANTENNA SYSTEM

(75) Inventors: Hans Gregory Schantz, Hampton Cove, AL (US); Eric Richards, Madison, AL (US); Andrew Compston, Stanford, CA (US)

(73) Assignee: Q-Track Corporation, Huntsville, AL (US)

( * ) Notice: Subject to any disclaimer, the term of this patent is extended or adjusted under 35 U.S.C. 154(b) by 269 days.

(21) Appl. No.: 12/857,528

(22) Filed: Aug. 16, 2010

(65) Prior Publication Data

US 2012/0007787 A1 Jan. 12, 2012

Related U.S. Application Data (63) Continuation-in-part of application No. 12/834,821, filed on Jul. 12, 2010.

(51) Int. Cl.
*H01Q 7/08* (2006.01)
(52) U.S. Cl.
USPC .......................................... 343/788; 343/866
(58) Field of Classification Search .................. 343/788, 343/866
See application file for complete search history.

(56) References Cited

U.S. PATENT DOCUMENTS

| | | | | |
|---|---|---|---|---|
| 716,134 | A | 12/1902 | Stone | 342/417 |
| 1,483,383 | A | 2/1924 | Sandell | 455/274 |
| 2,266,262 | A | 12/1941 | Polydoroff | 343/764 |
| 2,282,030 | A | 5/1942 | Busignies | 342/432 |
| 2,339,234 | A | 1/1944 | Polydorff | 343/788 |
| 2,399,382 | A | 4/1946 | Polydorff | 343/788 |
| 2,432,858 | A | 12/1947 | Brown | 343/791 |
| 2,521,550 | A | 9/1950 | Smith | 343/742 |
| 3,046,549 | A | 7/1962 | Kalmus | 342/385 |
| 3,121,228 | A | 2/1964 | Kalmus | 342/488 |

(Continued)

FOREIGN PATENT DOCUMENTS

| | | |
|---|---|---|
| EP | 1226729 A1 | 7/2002 |
| GB | 5811 | 0/1903 |

OTHER PUBLICATIONS

W.J. Polydoroff, *High Frequency Magnetic Materials: Their Characteristics and Principal Applications*, (New York: John Wiley & Sons, 1960), pp. 166-169.

(Continued)

*Primary Examiner* — Jason M Crawford
(74) *Attorney, Agent, or Firm* — James Richards (57) ABSTRACT

An inexpensive planar antenna fabricated as a plurality of parallel layers of multi turn spiral loops co-located with conductive material at the center of the loops, there being an exclusion zone free of conductive material between the innermost loop and the conductive material at the center. The conductive material may comprise circuit elements, for example batteries, amplifiers, antenna drivers or other functional elements as well as passive elements. In one embodiment, the loop traces may be staggered. In another embodiment, the loop traces are varied in width as a function of position within the loop cross section. In further embodiments, the planar form is integrated with additional orthogonal planar antennas substantially coplanar with the first planar antenna and having axes orthogonal to the first planar antenna and to one another. In further embodiments the exclusion zone is extended by design rules and confining routes in a circuit section. The antenna system may be configured as a three dimensional omnidirectional antenna and is well adapted for small form factor hand held and portable wireless applications.

25 Claims, 6 Drawing Sheets

U.S. PATENT DOCUMENTS

| | | | | |
|---|---|---|---|---|
| 3,413,644 | A | 11/1968 | Laub | 343/800 |
| 3,440,542 | A | 4/1969 | Gautney | 455/274 |
| 3,448,440 | A | 6/1969 | Wiegand | 365/244 |
| 3,713,148 | A | 1/1973 | Cardullo et al. | 342/42 |
| 3,868,565 | A | 2/1975 | Kuipers | 324/207.26 |
| 3,983,474 | A | 9/1976 | Kuipers | 324/207.18 |
| 4,054,881 | A | 10/1977 | Raab | 342/448 |
| 4,314,251 | A | 2/1982 | Raab | 342/463 |
| 5,771,438 | A | 6/1998 | Palermo et al. | 455/41.1 |
| 6,060,882 | A | 5/2000 | Doty | 324/318 |
| 6,067,052 | A | 5/2000 | Rawles | 343/741 |
| 6,081,241 | A * | 6/2000 | Josefsson et al. | 343/771 |
| 6,147,655 | A * | 11/2000 | Roesner | 343/741 |
| 6,538,617 | B2 | 3/2003 | Rochelle | 343/788 |
| 6,720,930 | B2 | 4/2004 | Johnson | 343/742 |
| 6,774,642 | B2 | 8/2004 | Lin et al. | 324/660 |
| 6,885,354 | B2 * | 4/2005 | Takei | 343/870 |
| 6,885,357 | B2 * | 4/2005 | Mi | 345/94 |
| 7,321,290 | B2 | 1/2008 | Stevens et al. | 340/10.1 |
| 7,323,994 | B2 * | 1/2008 | Yamagajo et al. | 340/572.7 |
| 7,504,951 | B2 * | 3/2009 | Phipps et al. | 340/572.7 |
| 7,546,671 | B2 * | 6/2009 | Finn | 29/592.1 |
| 7,786,950 | B2 * | 8/2010 | Ohashi | 343/788 |
| 7,973,722 | B1 * | 7/2011 | Hill et al. | 343/702 |
| 7,990,326 | B2 * | 8/2011 | Nakamura et al. | 343/742 |
| 8,063,844 | B1 | 11/2011 | Pease | 343/788 |
| 8,115,691 | B2 * | 2/2012 | Takasu | 343/702 |
| 2006/0192723 | A1 * | 8/2006 | Harada et al. | 343/866 |
| 2007/0046544 | A1 * | 3/2007 | Murofushi et al. | 343/700 MS |
| 2008/0111756 | A1 * | 5/2008 | Ochi et al. | 343/788 |
| 2008/0252538 | A1 | 10/2008 | Ying | 343/767 |
| 2009/0121949 | A1 * | 5/2009 | Washiro | 343/702 |
| 2009/0315799 | A1 * | 12/2009 | Eray et al. | 343/788 |
| 2009/0322634 | A1 * | 12/2009 | Yun et al. | 343/741 |
| 2010/0283698 | A1 * | 11/2010 | Orihara | 343/788 |
| 2010/0302039 | A1 * | 12/2010 | Goto et al. | 340/572.7 |
| 2012/0112971 | A1 * | 5/2012 | Takeyama et al. | 343/702 |

OTHER PUBLICATIONS

Kalmus, "A new guiding and tracking system," IRE Transactions on Aerospace and Navigational Electronics, Mar. 1962, vol. ANE-9, Issue 12, pp. 7-10.

Raab, "Quasistatic magnetic-field technique for determining position and orientation," IEEE Transactions on Geoscience and Remote Sensing, vol. GE-19, Issue 4, Oct. 1981, pp. 235-245.

Raab et al, "Magnetic position and orientation tracking system," IEEE Transactions on Aerospace and Electronic Systems, vol. AES-15 No. 5, Sep. 1979, pp. 709-717.

Hertz, Electric Waves, 1893, pp. 109.

Fleming, The Principles of Electric Wave Telegraphy, London: Longmans, Green, and Co., 1908, pp. 31-32.

Morecroft, Principles of Radio Communication, 2nd ed., New York: John Wiley, 1921, pp. 194-203.

Ghirardi, Radio Physics Course, New York: Farrar & Rinehart, 1930, pp. 601-605.

Terman, Radio Engineering, 1st ed. New York: McGraw-Hill, 1932, pp. 40-41.

J.A. Goulbourne, HF Antenna Cookbook, 2nd ed. Texas Instruments Technical Application Report 11-08-26-001, Jan. 2004, Fig. 27, p. 19.

HF Antenna Design Notes, Texas Instruments Technical Application Report 11-08-26-003, Sep. 2003, Fig. 3, p. 4.

Schantz, "Origins of RF Based Location Technology" 2011 IEEE Radio and Wireless Symposium (submitted), Jan. 16-20, 2011.

Schantz, "RF Based Location Technology Since World War II" 2011 IEEE Radio and Wireless Symposium (submitted), Jan. 16-20, 2011.

* cited by examiner

PLANAR LOOP ANTENNA SYSTEM

This application is a continuation in part of U.S. application Ser. No. 12/843,821, titled: "Space Efficient Magnetic Antenna Method," filed Jul. 12, 2010 by Schantz et al. which is incorporated herein by reference in its entirety.

This invention was made with Government support under Contract W15P7T-07-C-M007 awarded by the U.S. Army and under Grant 2R44ES016727 awarded by the National Institute of Environmental Health Sciences. The Government has certain rights in the invention.

FIELD OF THE INVENTION

The present invention pertains to the field of compact loop antennas, more particularly, to loop antennas typically integrated into portable and hand held devices typically for use in the high frequency (HF) bands and lower.

1. Background

In recent decades, interest in high-frequency, microwave radio frequency (RF) electronic systems has increased substantially. This interest in high frequency RF follows from increasing demand for higher data rate communications systems. These higher data rates are most easily implemented using higher frequency, short wavelength microwave RF systems. However, RF systems can be used for more than just high-data-rate communications. For a host of applications, including Real-Time Location Systems (RTLS), Radio Frequency Identification (RFID), low data rate Near-Field Communications (NFC), and wireless power transfer, lower frequency RF links offer superior penetration, propagation, and performance. The present invention is directed toward a loop antenna system well suited for these often neglected lower frequency applications.

2. Summary of the Invention

The present invention pertains to an inexpensive planar antenna fabricated as a plurality of parallel layers of multi turn spiral loops co-located with conductive material at the center of the loops, there being an exclusion zone free of conductive material between the innermost loop and the conductive material at the center. The conductive material may comprise circuit elements, for example batteries, amplifiers, antenna drivers or other functional elements as well as passive elements. In one embodiment, the loop traces may be staggered. In another embodiment, the loop traces are varied in width as a function of position within the loop cross section. In further embodiments, the planar form is integrated with additional orthogonal planar antennas substantially coplanar with the first planar antenna and having axes orthogonal to the first planar antenna and to one another. The antenna system may be configured as a three dimensional omnidirectional antenna and is well adapted for small form factor hand held and portable wireless applications.

In a further embodiment, the conductive material in the center of the loops is configured to minimize coupling to the loops. The conductive material may be a circuit designed with layout rules to minimize coupling to the loops. The layout rules may include minimizing or eliminating ground or power planes, elimination of trace closed loops, or minimizing trace width and/or thickness. Attention to bypass capacitors and potential AC closed loops through bypass capacitors and other circuit paths. The layout may include bundle tree routing characterized by at least one or more of the following:

1) routes occupying a subset of the available board space,
2) unrelated nets parallel routed in a tree formation,
3) nets with longer paths along the tree formation than would be routed by direct point to point if additional existing board space were made available for routing, or
4) additional vias used to create the compact tree pattern vs. the vias that would be used for direct point to point routing if additional existing board space were made available for routing.

A method of routing may include the use of peripheral keep out zones to confine circuit routes to a central tree pattern.

In a further embodiment, the planar loop antenna may include a plurality of mutually coupled loops supported by a planar substrate and connected in series, the plurality of mutually coupled loops being arranged in a common rotation orientation; the planar substrate having at least two layers; wherein the plurality of mutually coupled loops comprise a plurality of metallic traces characterized by a width of each trace, a thickness of each trace, and a horizontal spacing between adjacent traces; the metallic traces forming multiple loops on each of at least two layers of said substrate and at least one loop is varied in width as a function of position within a cross section of said planar loop antenna.

In a further embodiment, the planar loop antenna may form a system mutually orthogonal antennas having orthogonal directional patterns. One or more mutually orthogonal magnetic antennas of thin flat planar profile may be combined in the package with the planar loop antenna substantially within the plane of the planar loop antenna, thus enabling a thin package multiple axis electronic device.

BRIEF DESCRIPTION OF THE DRAWINGS

FIG. 6a presents an isometric view of a preferred embodiment planar loop antenna printed circuit board.

FIG. 6g represents a magnified view of a portion of FIG. 6a.

FIG. 8a discloses a default cross-section of a preferred embodiment planar loop antenna PCB along cross-section line 8a-8a.

FIG. 8b discloses a cross-section of a first alternate to the preferred embodiment planar loop antenna PCB along cross-section line 8a-8a.

FIG. 8c discloses a cross-section of a second alternate to the preferred embodiment planar loop antenna PCB along cross-section line 8a-8a.

FIG. 8d discloses a cross-section of a third alternate to the preferred embodiment planar loop antenna PCB along cross-section line 8a-8a.

FIG. 8e discloses a cross-section of a fourth alternate to the preferred embodiment planar loop antenna PCB along cross-section line 8a-8a.

FIG. 8f discloses a cross-section of a fifth alternate to the preferred embodiment planar loop antenna PCB along cross-section line 8a-8a.

FIG. 8g discloses a cross-section of a sixth alternate to the preferred embodiment planar loop antenna PCB along cross-section line 8a-8a.

FIG. 8h discloses a cross-section of a seventh alternate to the preferred embodiment planar loop antenna PCB along cross-section line 8a-8a.

3 DETAILED DESCRIPTION OF THE PREFERRED EMBODIMENTS 3.1 Overview of the Invention The present invention is directed toward a Planar Loop Antenna System and Applications. This disclosure will now describe the present invention more fully in detail with respect to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention teaches the use of a planar antenna including multiple layers of loops co-located with an RF device on a common substrate—a printed circuit board (PCB) in a preferred embodiment. The multiplicity of loops surround an enclosed exclusion zone from which circuits, batteries, or other conducting elements are excluded. The exclusion zone provides adequate region within which magnetic flux lines may freely pass so as not to impair performance of a planar magnetic antenna. At the center of the exclusion zone is a region within which conducting structures (circuitry composing RF modules, batteries, other device components, and the like) might reside.

The present invention further introduces the novel feature that the traces comprising loops within a planar antenna may be arranged with variable spacing and width so as to minimize loss, maximize quality factor (Q) and optimize antenna performance. This application presents a variety of alternate cross-sections to illustrate the range of optional configuration and further describes which configurations appeared most promising in the inventors' prototyping.

The planar loop antennas of the present invention are typically magnetic antennas—antennas principally responsive to a magnetic signal as opposed to an electric signal. In far-field signals, there is an equal balance between electric and magnetic energy. In near-field signals, the distinction between electric and magnetic signals becomes more important.

3.2 System Level Block Diagrams

Planar loop antennas as disclosed in the present application may be advantageously employed in a variety of systems including combinations with other antennas. This section presents some top level system block diagrams to illustrate how the present invention fits within the larger context of an RF device.

Figure 1A:
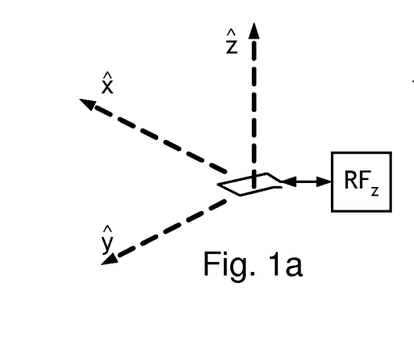
FIG. 1a provides a block diagram of a single magnetic antenna radio frequency (RF) system.

FIG. 1a provides an exemplary block diagram of a single magnetic antenna radio frequency (RF) system. The block diagram of FIG. 1a shows a single magnetic antenna coupled with a first (z) RF module. The z-axis is defined so as to align with the magnetic moment of a single magnetic antenna. First (z) RF module may be a receiver, transmitter, transceiver, or any other RF device.

Figure 1B:
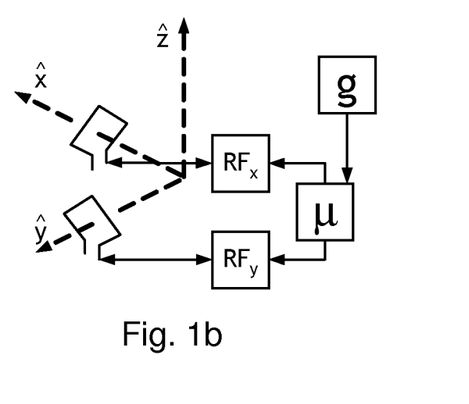
FIG. 1b provides a block diagram of a dual orthogonal magnetic antenna RF system.

FIG. 1b provides an exemplary block diagram of a dual orthogonal magnetic antenna RF system. The dual orthogonal magnetic antenna receive system of FIG. 1b comprises a first magnetic antenna coupled to a first (x) RF module, and a second magnetic antenna coupled to a second (y) RF module. A magnetic moment vector of a first magnetic antenna generally defines an "x" axis, while a magnetic moment vector of a second magnetic antenna generally defines a "y" axis. The x-axis and the y-axis are substantially orthogonal to each other.

A first (x) RF module and a second (y) RF module may be coordinated or controlled via an optional microprocessor which in turn may accept input from an accelerometer. If a microprocessor and an accelerometer are employed in conjunction with a dual orthogonal magnetic antenna RF system, then the behavior or function of a dual orthogonal magnetic antenna RF system may be modified or adjusted to compensate for tilt or orientation. For instance, in one embodiment a z-axis may be generally aligned with a local gravitational acceleration vector, and a dual orthogonal magnetic antenna RF system may be a transmitter wherein a first (x) RF module and a second (y) RF module act as quadrature transmitters, driving a first magnetic antenna and a second magnetic antenna (respectively) in a clockwise quadrature. If the orientation of a dual orthogonal magnetic antenna RF system is flipped so that a z-axis may be generally aligned in opposition to a local gravitational acceleration vector, then a microprocessor might control a first (x) RF module and a second (y) RF module causing them to invert the quadrature with respect to a z-axis, thus maintaining the sense of the quadrature transmission with respect to a local gravitational field vector.

Figure 2A:
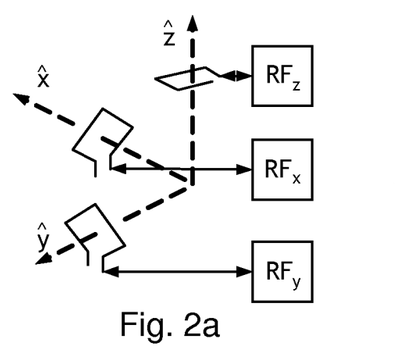
FIG. 2a provides a block diagram of a triply orthogonal magnetic antenna RF system.

FIG. 2a provides an exemplary block diagram of a triply orthogonal magnetic antenna RF system. The triply orthogonal magnetic antenna RF system of FIG. 2a comprises a first magnetic antenna coupled to a first (x) RF module, a second magnetic antenna coupled to a second (y) RF module, and a third magnetic antenna coupled to a third (z) RF module. A magnetic moment vector of a first magnetic antenna generally defines an "x" axis, a magnetic moment vector of a second magnetic antenna generally defines a "y" axis, and a magnetic moment vector of a third magnetic antenna defines a "z" axis. The x-axis, the y-axis, and the z-axis are substantially mutually orthogonal to each other. The triply orthogonal magnetic antenna RF system of FIG. 2a is particularly desirable for a device in which any or all of the three possible orthogonal components of a magnetic field are desired to be transmitted or received.

Figure 2B:
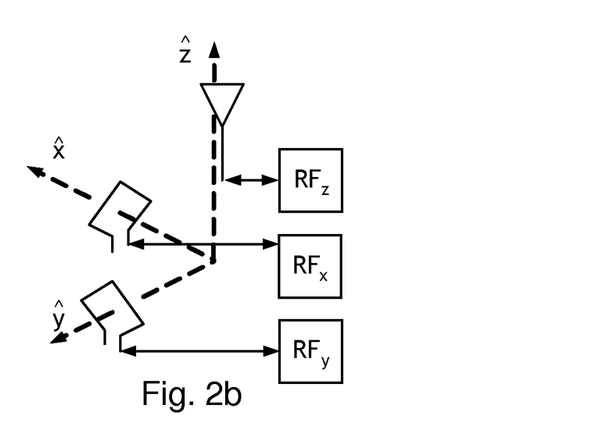
FIG. 2b provides a block diagram of a dual orthogonal magnetic antenna RF system supplemented by a mutually orthogonal electric antenna element.

FIG. 2b provides an exemplary block diagram of a dual orthogonal magnetic antenna RF system supplemented by a mutually orthogonal electric antenna element. The dual orthogonal magnetic antenna RF system supplemented by a mutually orthogonal electric antenna element of FIG. 2b comprises a first magnetic antenna coupled to a first (x) RF module, a second magnetic antenna coupled to a second (y) RF module, and a third orthogonal electric antenna coupled to a (z) RF module. A magnetic moment vector of a first magnetic antenna generally defines an "x" axis, a magnetic moment vector of a second magnetic antenna generally defines a "y" axis, and an electric moment vector of a third magnetic antenna defines a "z" axis. The x-axis, the y-axis, and the z-axis are substantially mutually orthogonal to each other.

FIGS. 1b, 2a, 2b show multiple antenna planar loop antenna systems in which a plurality of RF modules operate in conjunction with various embodiments of a planar loop antenna system. In still further embodiments, the functionality of these pluralities of RF modules might be performed by a lesser number of RF modules, in conjunction with multiplexers, switches, signal combiners, signal dividers, quadrature signal combiners, quadrature signal dividers, hybrids, or other such RF components or devices.

Figure 3A:
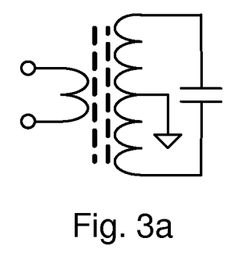
FIG. 3a provides a circuit diagram of a transformer coupled magnetic antenna.

FIG. 3a provides an exemplary circuit diagram of a transformer coupled magnetic antenna. The transformer coupled magnetic antenna system of FIG. 3a comprises a primary antenna inductive coil, a tuning capacitance, an optional grounded center tap and a secondary coupling inductive coil connected to antenna terminals. Transformer coupling may occur through the indicated air core, or through the intermediary of a ferrite or other magnetic core.

An optional grounded center tap helps the inherently differential or unbalanced primary antenna inductive coil maintain a symmetric current distribution. A secondary coupling inductive coil works in conjunction with a primary antenna inductive coil to transform the relatively high impedance resonant antenna circuitry (including the primary antenna inductive coil and tuning capacitance) to a relatively lower impedance at the antenna terminals. The transformer coupled magnetic antenna system of FIG. 3a works well for applications requiring a modest impedance connection to an RF module.

Figure 3B:
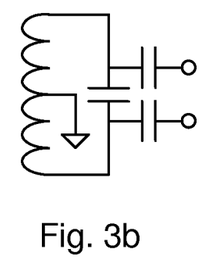
FIG. 3b provides a circuit diagram of a capacitively coupled magnetic antenna.

FIG. 3b provides an exemplary circuit diagram of a capacitively coupled magnetic antenna. The capacitively coupled magnetic antenna system of FIG. 3b comprises a primary antenna inductive coil, an optional grounded center tap, a tuning capacitance, and coupling capacitors connected to antenna terminals. The capacitively coupled magnetic antenna system of FIG. 3b offers an alternative to the transformer coupled magnetic antenna system of FIG. 3a in which a secondary coupling inductive coil is not required thus freeing up space for additional primary antenna inductive coil turns. In practice, applicants favor transformer coupled magnetic antennas over capacitively coupled magnetic antennas for ease of implementation and reliability.

Figure 3C:
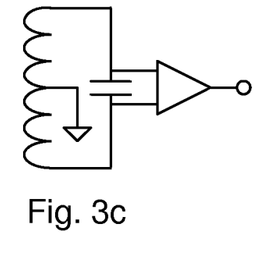
FIG. 3c provides a circuit diagram of a direct coupled magnetic antenna.

FIG. 3c provides an exemplary circuit diagram of a direct coupled magnetic antenna. The direct coupled magnetic antenna system of FIG. 3c comprises a primary antenna inductive coil, an optional grounded center tap, a tuning capacitance, and a high input impedance differential amplifier. The direct coupled magnetic antenna system of FIG. 3c works well for receive applications, but would not be well-suited for many transmission applications.

FIGS. 3a-3c provide three exemplary ways in which a planar loop antenna system might be coupled to an RF module. These coupling examples are provided to help a reader understand the principles of the present invention and should not be interpreted as limiting the ways in which a planar loop antenna might be coupled to an RF module. In describing a particular set of loops or turns as "primary" versus "secondary," Applicants do not follow the practice of circuit engineers who define the driven side of a transformer structure as "primary." This conventional practice would swap the labels "primary" and "secondary" when a particular antenna is used for transmission as opposed to reception. Instead, Applicants follow the antenna engineering practice of defining the secondary side as the side of a transformer in contact with a circuit while the primary side is the antenna side that couples to fields in free space.

3.3 Various Embodiments

Planar loop antennas as disclosed in the present application may be advantageously employed in a variety of systems including combinations with other antennas. This section presents a variety of specific planar loop antenna system embodiments.

Figure 4A:
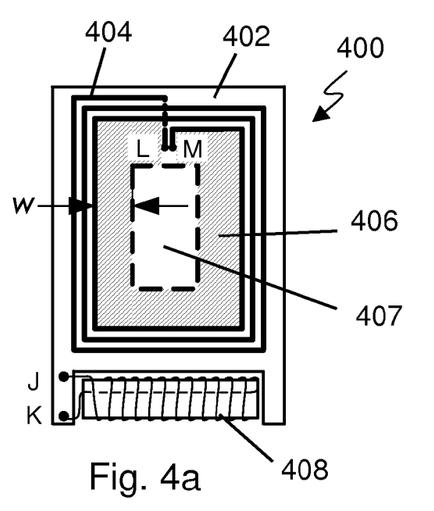
FIG. 4a discloses a first embodiment planar loop antenna system including an additional orthogonal magnetic antenna.

FIG. 4a discloses an exemplary first embodiment planar loop antenna system 400 including a planar wound magnetic antenna 404 and a substantially coplanar orthogonal axis magnetic antenna 408. A first embodiment planar loop antenna system comprises a planar loop antenna 404, and an orthogonal axis magnetic antenna 408.

The planar loop antenna comprises a substrate 402 on which a plurality of traces 404 are generally arranged in loops around a shaded exclusion zone 406 of a characteristic or typical width (w). The exclusion zone 406 contains no windings or conductive material. An individual loop or turn is that length of trace which constitutes approximately one complete circulation around a center of rotation. In FIG. 4a and elsewhere in this disclosure, a plurality of traces are shown in a substantially rectangular configuration so as to make a planar loop antenna conformal to the typically rectangular configuration of many consumer electronic devices. More generally, however, a plurality of traces are preferentially arranged in whatever configuration or geometry routes the traces close to the outer edge of the substrate so as to maximize the area within the traces. This will typically be conformal to the perimeter of a printed circuit board (PCB) which is in turn substantially conformal to a perimeter of a device.

The plurality of traces terminate in terminals L and M enabling connection to a co-located RF module. The RF module may be at the center 407 of the antenna 404 inside the inside perimeter of the exclusion zone 406, i.e., not in the exclusion zone. A resulting magnetic moment vector for the planar loop antenna lies in substantially the same direction as the substrate normal.

The shaded exclusion zone 406 provides a region devoid of circuits, batteries, or other conducting elements. Thus, magnetic flux lines may easily pass through the substrate in the shaded exclusion zone so as to enhance performance of a planar loop antenna. The exclusion zone 406 may be thought of as the air core of the planar loop antenna. The exclusion zone in a preferred embodiment contains only air, the dielectric of the PCB, and perhaps plastic of a surrounding enclosure. This near unity permeability core does not strictly confine field lines to the exclusion zone resulting in flux lines passing through traces of a planar loop antenna and resulting losses. This ferrite-free design has the advantages of low cost and low weight. For some applications, less cost or weight sensitive. Alternatively, addition of ferrite material in the exclusion zone may prove advantageous. FIG. 8g will show a cross-section of a ferrite loaded alternate embodiment. This disclosure will present further details and description of the exclusion zone in FIGS. 7a-7b, FIGS. 8a-8g, and associated specifications.

Circuits comprising a plurality of RF modules and other supplemental conducting elements such as batteries may be placed in the safe zone 407 within the exclusion zone 406. These conducting structures are sized and spaced within an exclusion zone 406 of adequate width (w) so as to avoid perturbing the magnetic field structure upon which the behavior and performance of a planar loop antenna relies.

The orthogonal magnetic antenna 408 is preferentially a ferrite loaded loopstick antenna. Alternatively, a generally solenoidal arrangement of loops along an axis substantially orthogonal to the substrate normal may be used. The orthogonal magnetic antenna couples to the substrate via terminals (J, K) that enable connection to an RF module co-located with the substrate occupying safe zone 407.

The first embodiment planar loop antenna system of FIG. 4a may be used with the system-level block diagram of FIG. 1b. If the first embodiment planar loop antenna system of FIG. 4a omitted an orthogonal magnetic antenna, the antenna could be used with the system-level block diagram of FIG. 1a.

Figure 4B:
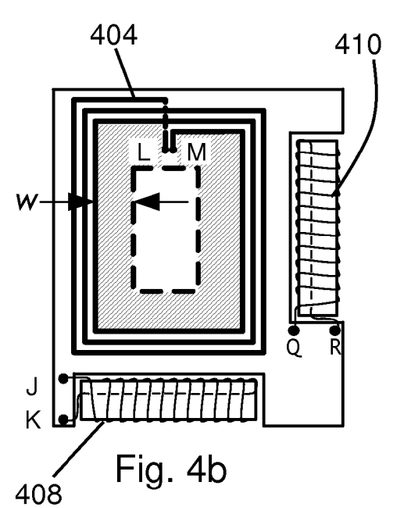
FIG. 4b discloses a second embodiment planar loop antenna system including a first additional mutually orthogonal magnetic antenna and a second additional mutually orthogonal magnetic antenna.

FIG. 4b discloses an exemplary second embodiment planar loop antenna system including a planar would loop antenna with a first mutually orthogonal axis magnetic antenna and a second mutually orthogonal magnetic antenna. The second embodiment planar loop antenna system comprises a planar loop antenna 404, a first orthogonal magnetic antenna 408, and a second mutually orthogonal magnetic antenna 410. The second embodiment planar loop antenna system of FIG. 4b provides an additional mutually orthogonal magnetic antenna 410 coupling to the substrate 402 via terminals (Q, R) that enable connection to an RF module co-located with the substrate. The second embodiment planar loop antenna system of FIG. 4b may be used with the system-level block diagram of FIG. 2a.

Figure 5A:
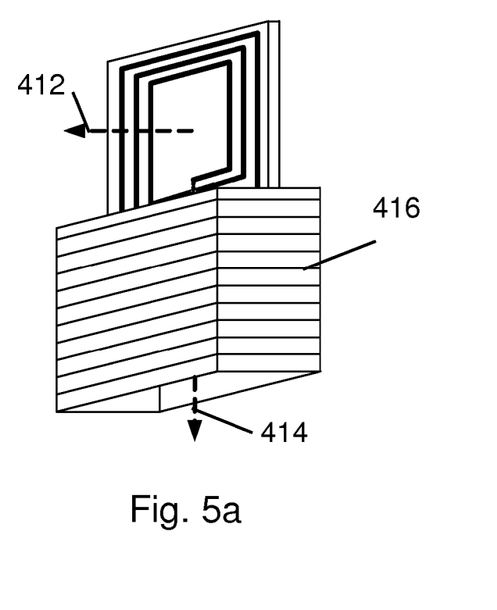
FIG. 5a discloses a third embodiment planar loop antenna system including an additional mutually orthogonal air core magnetic antenna.

FIG. 5a discloses an exemplary third embodiment planar loop antenna system including an additional mutually orthogonal air core magnetic antenna. The third embodiment planar loop antenna system comprises a planar loop antenna with magnetic moment 412 substantially normal to the substrate in conjunction with an air core magnetic antenna 416 whose magnetic moment 414 lies substantially orthogonal to the magnetic moment 412 of the planar loop antenna. The third embodiment planar loop antenna system of FIG. 5a may be used with the system-level block diagram of FIG. 1b.

Figure 5B:
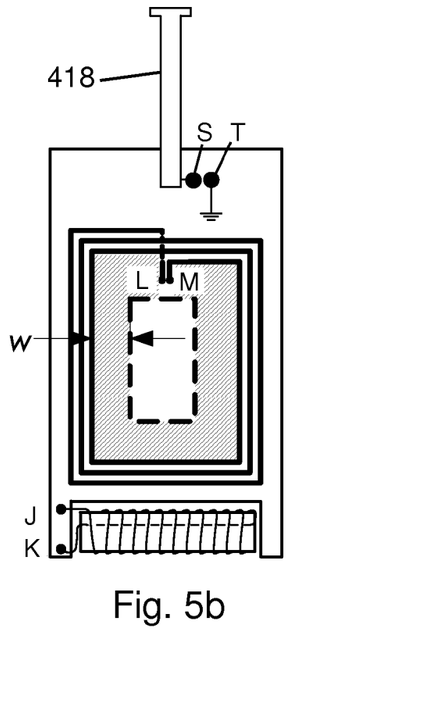
FIG. 5b discloses a fourth embodiment planar loop antenna system including an additional mutually orthogonal magnetic antenna and an additional mutually orthogonal electric antenna.

FIG. 5b discloses an exemplary fourth embodiment planar loop antenna system including an additional mutually orthogonal magnetic antenna and an additional mutually orthogonal electric antenna. The additional mutually orthogonal electric antenna comprises an electric antenna element 418 acting as a monopole coupled to a terminal "S," and a substrate ground acting as a counterpoise coupled via a terminal "T." The fourth planar loop antenna system of FIG. 5b may be used with the system-level block diagram of FIG. 2b.

3.4 Preferred Embodiment

This section describes a preferred embodiment planar loop antenna system.

Figures 6A, 6G:
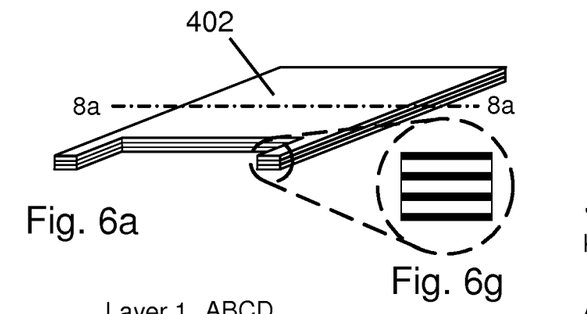

FIG. 6a presents an isometric view of an exemplary preferred embodiment planar loop antenna printed circuit board (PCB). The preferred embodiment planar loop antenna PCB 402 is a four-layer board, which is to say it comprises three layers of substrate and four layers of metallization. In alternate embodiments, different numbers of layers are possible. FIGS. 8a-8h will present a variety of alternate cross-section views of the multi-layer substrate along cross-section line 8a-8a.

FIG. 6g illustrates the detail of the four layers of FIG. 6a.

Figure 6B:
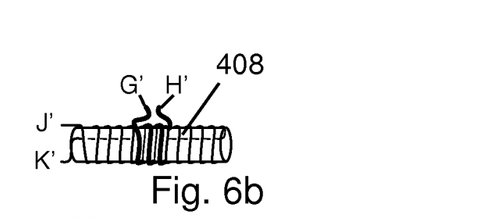
FIG. 6b presents an isometric view of an orthogonal magnetic antenna element for use in conjunction with a preferred embodiment planar loop antenna printed circuit board.

FIG. 6b presents an isometric view of an exemplary orthogonal magnetic antenna element for use in conjunction with a preferred embodiment planar loop antenna PCB. In a preferred embodiment, the orthogonal magnetic antenna element 408 comprises a ferrite core, a primary winding terminating in wire ends J' and K', and a secondary winding terminating in wire ends G' and H'. A secondary winding works in conjunction with a primary winding to form a transformer, thus enabling a more practical, lower impedance for an orthogonal magnetic antenna.

Figure 6C:
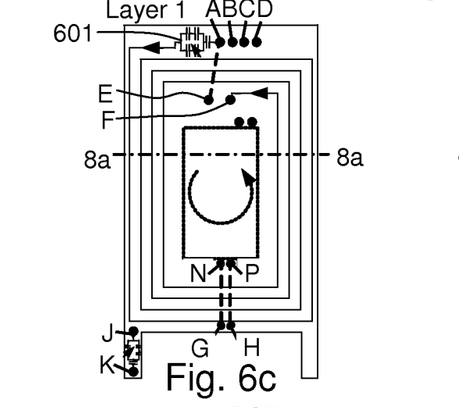
FIG. 6c presents a first layer of a preferred embodiment planar loop antenna printed circuit board.

FIG. 6c presents a first layer of an exemplary preferred embodiment planar loop antenna PCB. A first layer of a preferred embodiment planar loop antenna PCB includes a plurality of loops. Defining via "A" as a starting point, a plurality of loops circulate in a common rotation orientation generally in a counter-clockwise fashion (in this embodiment) terminating in via "F." The common rotation orientation is indicated by a circular arrow. Vias "A" and "E" are connected in a jumper to complete the circuit formed by the pluralities of loops on a first layer (A to F), a second layer (F to B), and a third layer (B to E, connected to A) of a preferred embodiment planar loop antenna PCB. Via C is not used. A first inline capacitive tuning circuit 601 provides a negative reactance precisely canceling out the positive reactance due to the inductance of the loop so as to achieve resonance at a desired frequency of operation. A first layer further includes a second inline capacitive tuning circuit for tuning an orthogonal magnetic antenna element.

The primary winding of an orthogonal magnetic antenna with ends J' and K' connects to a multilayer substrate at terminals "J" and "K." A second inline capacitive tuning circuit connecting vias or terminals J and K provides a negative reactance precisely canceling out the positive reactance due to the inductance of an orthogonal magnetic antenna element primary winding. Vias "G" and "H" allow a secondary winding with ends G' and H' to be connected to the multi-layer substrate. Vias G and H may be jumpered to terminals "P" and "N," by which an orthogonal magnetic antenna may be coupled to an RF module co-located with the multi-layer substrate. Applicants have found that ribbon cable works well for this application and further enables additional connections for power, signals, or other purposes to be co-located with the connection to the orthogonal magnetic antenna.

Figure 6D:
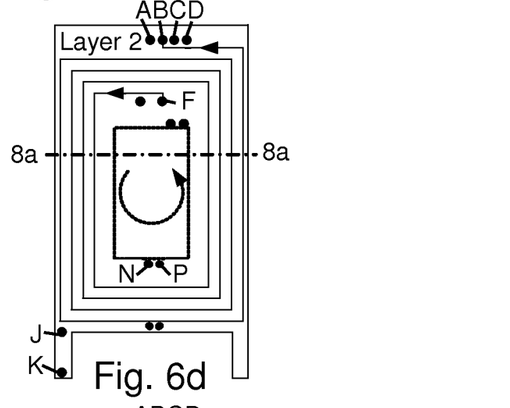
FIG. 6d presents a second layer of a preferred embodiment planar loop antenna printed circuit board.

FIG. 6d presents an exemplary second layer of a preferred embodiment planar loop antenna PCB. On a second layer of a preferred embodiment planar loop antenna PCB, a plurality of loops begin at via "F" as a starting point and circulate in a generally counter-clockwise fashion terminating in via "B."

Figure 6E:
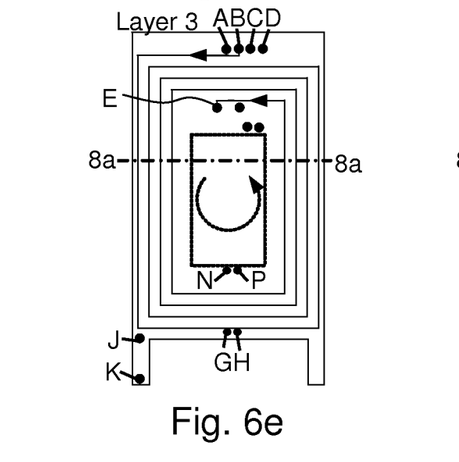
FIG. 6e presents a third layer of a preferred embodiment planar loop antenna printed circuit board.

FIG. 6e presents an exemplary third layer of a preferred embodiment planar loop antenna PCB. On a third layer of a preferred embodiment planar loop antenna PCB, a plurality of loops begin at via "B" as a starting point and circulate in a generally counter-clockwise fashion terminating in via "E."

Figure 6F:
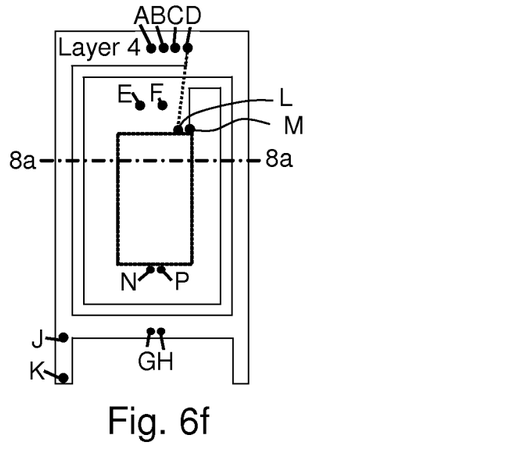
FIG. 6f presents a fourth layer of a preferred embodiment planar loop antenna printed circuit board.

FIG. 6f presents an exemplary fourth layer of a preferred embodiment planar loop antenna PCB. Pluralities of loops on a first, second, and third layer of a preferred embodiment planar loop antenna PCB constitute an antenna primary. On a fourth layer of a preferred embodiment planar loop antenna PCB, an antenna secondary comprises plurality of loops begin at via "M" as a starting point and circulate in a generally counter-clockwise fashion terminating in via "D." An antenna secondary works in conjunction with an antenna primary to form a transformer, thus enabling a more practical, lower impedance for a planar loop antenna. Vias "D" and "L" are connected by a jumper so as to make vias "L" and "M" terminals by which a planar loop antenna may be coupled to an RF module co-located with the multi-layer substrate.

3.5 Magnetic Fields and the Exclusion Zone

This section further explores some of the physics behind Applicant's invention, and how this electromagnetic physics gives rise to a variety of engineering tradeoffs in the implementation of a planar magnetic antenna system.

Figure 7A:
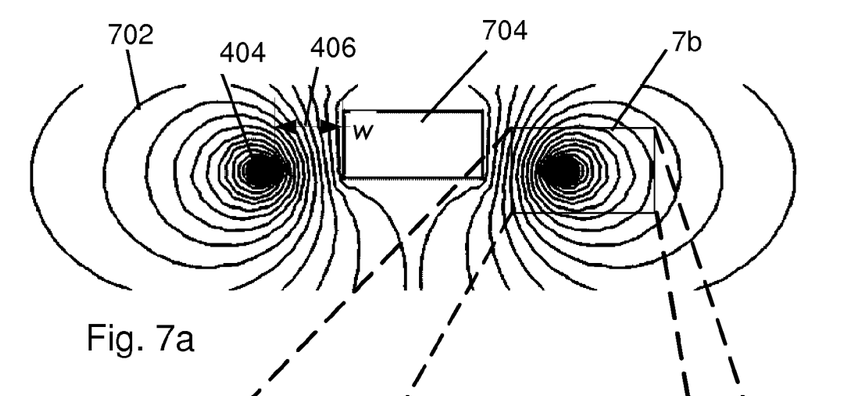
FIG. 7a plots a typical magnetic field configuration along a cross-section 8a-8a of a planar loop antenna system.

FIG. 7a plots a typical magnetic field configuration along a cross-section 8a-8a of an exemplary planar loop antenna system. Magnetic field lines 702 form loops around conducting traces 404 comprising a planar loop antenna. An exclusion zone 406 of typical width "w" allows magnetic field lines to pass through a multilayer substrate supporting conducting traces comprising a planar loop antenna. Magnetic fields are largely prevented from passing through conducting objects like circuits, components, and batteries. FIG. 7a further shows a rectangular cross-section of a perfect electric conductor (PEC) 704 positioned so as to model the impact of circuits and a battery pack on the field structure. Magnetic field (or equivalently, flux) lines pass through the relatively wide exclusion zone with only minor perturbations in the field lines due to the PEC obstruction. The PEC obstruction models conducting structures such as batteries, RF circuits, other circuits, or other conducting elements useful for the function of the device coupled to a planar magnetic antenna system. As the exclusion zone is made narrower (as "w" becomes smaller) more space is available for batteries, circuits, and other conducting device components. However the magnetic field lines become more perturbed and more restricted with the decreased area through which to pass. This reduces inductance, decreases Q and impairs antenna performance. Inventors have discovered that there is an engineering tradeoff between antenna performance and characteristic width w of an exclusion zone in the context of planar magnetic antennas.

Figure 7B:
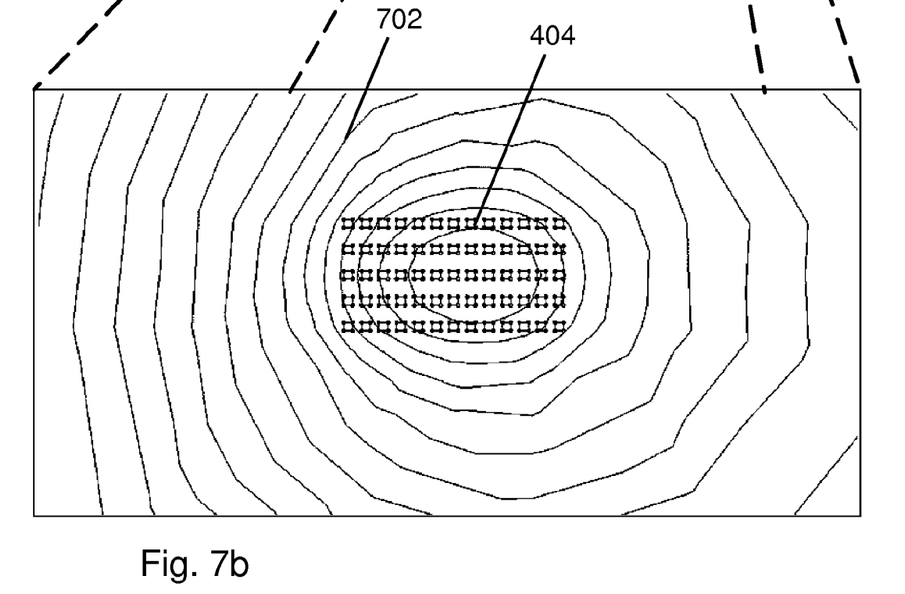
FIG. 7b plots a close-up of a typical magnetic field configuration along a cross-section 8a-8a of a planar loop antenna system in the vicinity of an assembly of conductive traces.

Applicants generated the plots of FIGS. 7a and 7b using the Finite Element Method Magnetics (FEMM) software application [Meeker, D.C. FEMM V.4.0.1]. This software application assumes a cylindrically symmetric configuration, however Applicants have discovered the software does an adequate job modeling planar loop antennas including rectangular planar loop antennas as envisioned in the present invention.

FIG. 7b plots a close-up of a typical magnetic field configuration along a cross-section 8a-8a of the planar loop antenna system of FIG. 7a in the vicinity of conductive traces. This particular antenna has a trace assembly comprising five layers of thirteen turns each for a total assembly of 65 primary turns. A sixth layer (not shown) is reserved for a smaller number of secondary turns so as to provide transformer coupling to the primary turns shown.

Note that magnetic field lines tend to cross individual traces toward the outside of the 65 turn assembly. This magnetic flux leads to concentrations of current flux within these exterior traces, thus tending to increase Ohmic losses. These losses may be offset to some extent by increasing the surface area of a trace (i.e. the perimeter of the trace in cross-section). This increase may be due to an increase in trace thickness or breadth or both, as further defined in the discussion on cross-sections in the following section. Applicants have found that FEMM is a useful tool for predicting performance of planar magnetic antennas and for establishing design parameters.

3.6 Cross Sections of a Planar Loop Antenna

This section discloses a variety of alternative cross-sections of a planar loop antenna. The cross-sections presented in this section are not intended to be exhaustive or comprehensive, but rather to aid the reader in understanding a few of the many possible implementations of the present invention. In each case, metallization layers are referred to in ordinal or cardinal fashion starting with a first layer or layer number one at the top. In each case a conducting structure such as a battery, RF module, or other circuitry is shown in the center of an exclusion zone 406 of width (w).

Figure 8A:
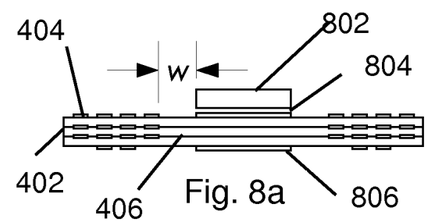

FIG. 8a discloses an exemplary default cross-section of a preferred embodiment planar loop antenna PCB along cross-section line 8a-8a shown in FIGS. 6a and 6c-6f. In the cross-section of FIG. 8a, a trace assembly comprises twelve primary turns 404 are distributed in three layers of four turns each, with an additional fourth layer of two secondary turns. Thus the cross-section of FIG. 8a corresponds to the layout of FIGS. 6c-6f. The cross-section of FIG. 8a further shows an exclusion zone 406 of characteristic width w, and a conductive battery 802 and circuits 804 and 806. The battery and circuits are exemplary. The circuits may comprise a module mounted on the substrate 402 and/or components and traces routed on or within the substrate 402. Components, wiring, and other conductive features may be vertically (off the substrate) within ½ or preferably 1/10 of the coil maximum radius or extent, if not round, to be effectively proximal to the substrate.

Figure 8B:
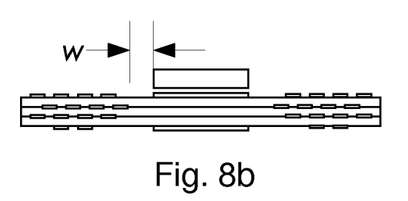

FIG. 8b discloses an exemplary cross-section of a first alternate to the preferred embodiment planar loop antenna PCB along cross-section line 8a-8a. In the first alternate cross-section of FIG. 8b, a trace assembly comprises twelve primary turns distributed in three layers of four turns each, with an additional fourth layer of two secondary turns. Traces in a middle layer of the primary turns are off-set from turns in the first and third layers, thus tending to reduce mutual or stray capacitance and increase the self-resonant frequency of a planar loop antenna system. This staggered offset also has the advantage of increasing the trace to trace distance between layers, further reducing losses due to the proximity effect. These improvements come at the cost of a slight decrease in exclusion zone width.

Figure 8C:
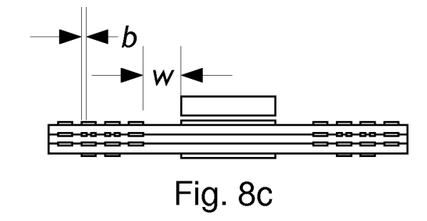

FIG. 8c discloses an exemplary cross-section of a second alternate to the preferred embodiment planar loop antenna PCB along cross-section line 8a-8a. In the second alternate cross-section of FIG. 8c, a trace assembly comprises fourteen primary turns distributed in top and bottom layers of four turns each sandwiching a middle layer of six turns. The middle layer of six turns comprises additional turns relative to the default by reducing breadth "b" of the internal turns. As in the default cross section, there is an additional fourth layer of two secondary turns. By restricting the smaller breadth traces to be in the internal layers, this approach partially shields these traces against the increased magnetic flux density presented on the perimeter of the loop antenna. However this is at the cost of increased Ohmic losses due to the smaller trace cross section. The configuration of FIG. 8c tends to increase the overall number of turns and the inductance while also increasing losses.

Figure 8D:
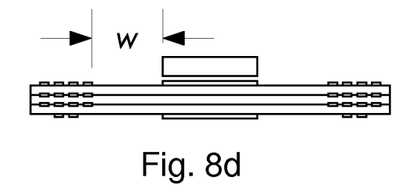

FIG. 8d discloses an exemplary cross-section of a third alternate to the preferred embodiment planar loop antenna PCB along cross-section line 8a-8a. In the third alternate cross-section of FIG. 8d, a trace assembly comprises twelve primary turns distributed in three layers of four turns each, with an additional fourth layer of two secondary turns, just as in the default cross-section of FIG. 8a. However exclusion zone width (w) has been maximized by minimizing both the breadth (b) of traces and the trace-trace gap (g). In general, reducing breadth of traces and the trace-trace gap increases loss. In turn this will decrease the effective Quality Factor, Q of the antenna and the gain. This is partially compensated by the increase in gain from the greater enclosed area and increased inductance of the antenna. Decreasing the trace-trace gap tends to increase the stray capacitance of a planar loop antenna thus decreasing the self-resonant frequency.

Figure 8E:
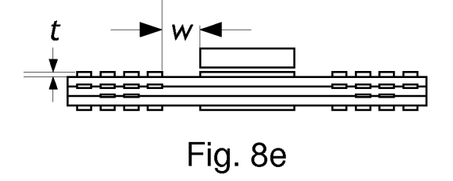

FIG. 8e discloses an exemplary cross-section of a fourth alternate to the preferred embodiment planar loop antenna PCB along cross-section line 8a-8a. In the fourth alternate cross-section of FIG. 8e, a trace assembly comprises twelve primary turns distributed in three layers of four turns each, with an additional layer of two secondary turns, just as in the default cross-section of FIG. 8a. However, the layer of secondary turns is now an internal layer, placing the secondary turns closer to the center of the primary turns, thus enabling better coupling between the secondary turns and the maximum number of primary turn magnetic field lines. In addition, the thickness (t) of the external traces of the first and fourth layers is increased, thus tending to decrease resistive losses an increase Q.

Figure 8F:
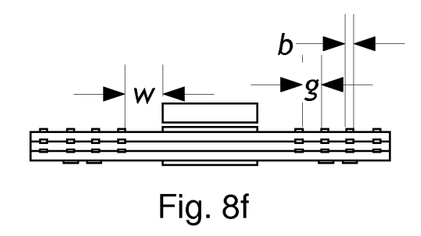
Figure 8G:
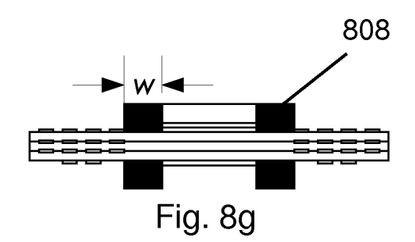

FIG. 8f discloses an exemplary cross-section of a fifth alternate to the preferred embodiment planar loop antenna PCB along cross-section line 8a-8a. In the fifth alternate cross-section of FIG. 8e, a trace assembly comprises twelve primary turns distributed in three layers of four turns each, with an additional fourth layer of two secondary turns, just as in the default cross-section of FIG. 8a. However the trace-trace gap (g) is increased while the breadth (b) of the traces are correspondingly decreased. The trade-off is between reduced cross section which increases Ohmic loss, and decreased loss from the trace-trace proximity effect.

FIG. 8g discloses an exemplary cross-section of a sixth alternate to the preferred embodiment planar loop antenna PCB along cross-section line 8a-8a. In the sixth alternate cross-section of FIG. 8g, a trace assembly comprises twelve primary turns distributed in three layers of four turns each, with an additional layer of two secondary turns, just as in the default cross-section of FIG. 8a. However, ferrite material 808 is added to the exclusion zone. This has the effect of concentrating magnetic field lines in the exclusion zone, increasing overall inductance and decreasing leakage inductance. Adding ferrite adds cost and weight and introduces the possibility of core losses, so as always, there are tradeoffs to be evaluated to optimize the design for a particular configuration.

Figure 8H:
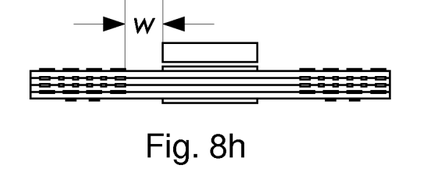

FIG. 8h discloses an exemplary cross-section of a seventh alternate to the preferred embodiment planar loop antenna PCB along cross-section line 8a-8a. In the seventh alternate cross-section of FIG. 8h, twenty primary turns are distributed in two layers of four turns each and two layers of six turns each, with an additional layer of two secondary turns, just as in the default cross-section of FIG. 8a. The second and third layers of primary turns comprise turns of lesser breadth than those of the first and fourth layer of primary turns. If overall thickness of a multilayer PCB is constant, then progressing from a four layer board to a six or more layer board necessarily implies closer spacing between the metallization layers, increased stray capacitance, and lower self-resonant frequency.

The magnetic moment and thus performance of a planar loop antenna is proportional to the product of current, number of turns, and effective area. Applicants have explored a number of parameters by which performance of a planar loop antenna may be configured, including, but not limited to: exclusion zone width, trace breadth, trace thickness, trace-trace gap, use of ferrite loading, number of traces, and number of layers. Further the inventors propose varying trace breadth and trace thickness so as to increase trace surface area (i.e. perimeter of a trace in cross-section) in traces near the exterior of the trace assembly so as to compensate in part for magnetic field lines penetrating the trace assembly. The discussion of this section is not intended to be an exhaustive treatise of the behavior of planar loop antennas, but rather to illustrate a few of the many ways in which the teachings of the present invention might be applied.

Note that within this disclosure, horizontal and vertical may be used to discuss relative position of elements relative to the orientation of FIG. 8a-8h—vertical meaning perpendicular to the plane of the substrate and horizontal meaning parallel to the plane of the substrate. This orientation is for reference and discussion only. The antenna and substrate may be oriented in any direction in practice.

3.7 Circuit Layout Adaptations and Embodiments

The inventors have found that it is possible and feasible to place circuitry in the center of a loop and further that the loop may be made on the same circuit board as the circuit. In one embodiment, the circuit is isolated from the magnetic field by shielding or by implementing a full ground and power plane, in which case an exclusion zone is provided to allow substantially normal operation of the loop antenna with minimal degradation due to the conductive center. In an alternative embodiment, the circuitry is implemented unshielded and without ground or power planes. Thus, the flux may pass between conductors, giving maximum cross sectional area available to the flux and permitting a smaller exclusion zone or even no exclusion zone. In the unshielded embodiment, steps may be taken to minimize the effect of the circuit on the coil and to minimize coupling between the circuit to the coil. This coupling may potentially result in noise or feedback degrading system performance.

In a first embodiment, any ground plane may be broken into sections to prevent conduction around the overall outer perimeter. The sections may be joined at a single point preferably at the center. If a low impedance ground plane is not necessary, the ground plane may be implemented as a ground net. The ground net may be wired as a zigzag pattern, but should not contain any closed loops as closed loops could couple to the coil field, reducing coil inductance and inducing currents and voltages in the loops. Preferably the ground net should be a radial star topology with traces emanating from a single connection at the center of the coil. Preferably still, especially for irregular coil shapes, the ground or power net traces may follow the gradient of the magnetic field from the coil, thus any voltages induced in the traces would be across the width of the traces rather than along the length of the traces.

As a further measure, the traces in any net should be the minimum width usable for that net. This will minimize eddy currents and the influence of the magnetic field of the loop.

As a further measure, all circuit nets should avoid any loops to minimize influence of the loop and minimize coupling to the loop.

As a further measure, plentiful use of bypass capacitors can minimize digital and other noises and couplings.

As a further measure, consider any potential closed AC loops formed through bypass capacitors and using more than one net to form the loop. Such loops should be eliminated. If the traces cannot be eliminated, the contained area in the closed loop should be minimized. Traces may be wired one on top of the other for zero contained area. A closed loop with an unavoidable area may be wired to additionally contain a reverse polarity area for compensation. A closed loop is a closed conductive path having an area within the closed path as observed perpendicular to the plane of the substrate.

Figure 9A:
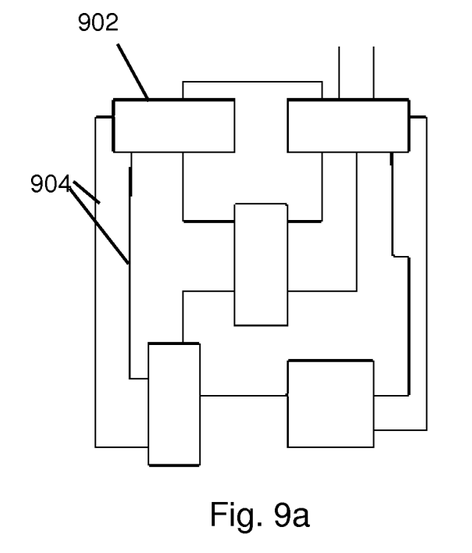
FIGS. 9a-9d illustrate various layout and routing configurations relating to an exclusion zone in accordance with the present invention.
Figure 9B:
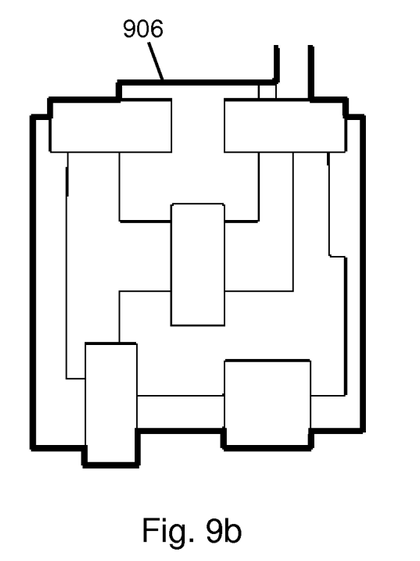

FIGS. 9a-9d illustrate various layout and routing configurations relating to an exclusion zone in accordance with the present invention. The detail of FIGS. 9a-9d relate to the circuitry portion, for example 804 of FIG. 8a. The coil windings 404 are not shown. FIG. 9a illustrates an exemplary conventional layout showing components 902 as rectangles and showing the wiring 904 between the components. In conventional layout, the wiring 904 is normally the shortest path from point to point that avoids obstacles and other wiring. FIG. 9b shows an exclusion zone associated with the conventional wiring of FIG. 9a. The exclusion zone is outside the outer perimeter 906 of the wiring 904 and components 902. Thus the exclusion zone inner perimeter 906 is shown as the heavy line 906 in FIG. 9b. FIG. 9b thus shows an embodiment where conventional layout is used with the exclusion zone architecture of the present invention.

Figure 9C:
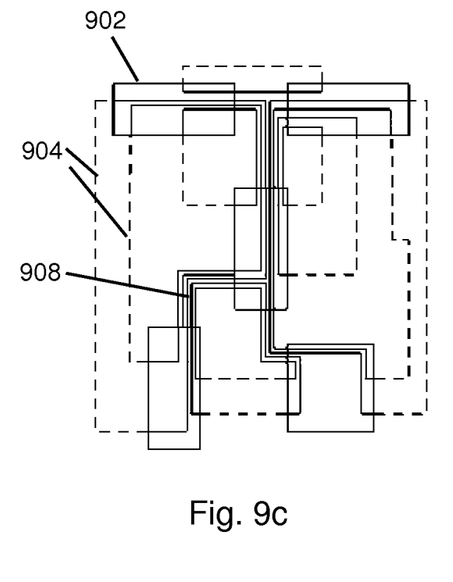
Figure 9D:
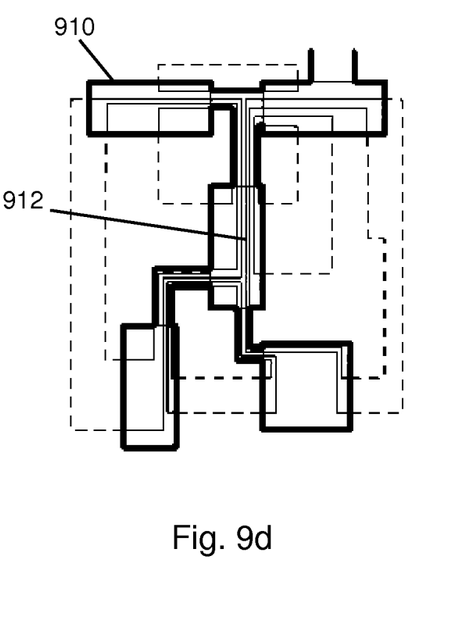

However, in a further embodiment of the invention, the wiring may be specifically adapted to increase the area of the exclusion zone for the same circuitry and interconnects. Referring to FIG. 9c, the wiring of FIG. 9a is shown as dotted lines 904 for comparison. The dotted line wiring is removed and the new routes are shown as solid lines 908. The new wiring 908 is routed such that traces of the same layer are routed parallel and adjacent to one another even though the length of the trace may be longer than the possible direct route trace 904. Traces may also stack on multiple layers to further compact the trace pattern. Not shown, but the number of vias may also increase, if necessary, to force the minimum circuit enclosed area. FIG. 9d illustrates the inner perimeter 910 of the exclusion zone of FIG. 9c, which is the outer perimeter 910 of the circuitry (components and traces) of FIG. 9c. The routing of FIG. 9c may be referred to as bundle tree routing, as bundles of unrelated nets are parallel routed in a tree architecture. In a further embodiment, the tree formation may be in a star or snow flake (branching) pattern radiating from a central point 912 in the center of the coil to maximize trace lengths orthogonal to the coil (radiating from the center) and minimize trace lengths parallel to the coil (perpendicular to the center radials). A magnetic model may more closely define the radial and perpendicular directions for complex coil shapes. The bundling of traces minimizes the effect of any unintended loops formed through bypass capacitors or low impedance circuit paths. Using many layout circuit packages, a large amount of manual routing may be necessary to achieve the most compact bundle tree formation. The process may begin by autorouting a first pass and then manually routing traces at the perimeter to compact the pattern. Alternatively, the autorouting may include the use of keep out zones around the outer perimeter of the circuit area where the autorouter will not route traces. The keep out zones may be incrementally increased in size (decreasing routable area) to force the routes to the center of the tree formation until the autorouter cannot complete the route. The last completed routing would be the one utilized. The routing personnel may observe trace density and missed routes to adjust routing keep out zones to compress space where traces are sparse and allow more space where traces are unrouted. In a further embodiment, an autoroute software package may be programmed to adaptively increase a routing keep out zone to compress the routing pattern into a compact bundle tree pattern in accordance with the teachings of this disclosure.

In a further embodiment, a subset of nets, typically power and ground nets and other nets with abundant bypass capacitors and likely unintended closed loops, may be routed first to form the most compact bundle tree formation, and then the remainder of the nets may be routed allowing greater routing area for the later routes.

Bundle tree routing may be characterized by at least one or more of the following:
1) routes occupying a subset of the available board space,
2) unrelated nets parallel routed in a tree formation,
3) nets with longer paths along the tree formation than would be routed by direct point to point if additional existing board space were made available for routing, or
4) additional vias used to create the compact tree pattern vs. the vias that would be used for direct point to point routing if additional existing board space were made available for routing.

Unrelated nets are nets that are not normally routed in parallel. Nets normally routed in parallel are bus nets and transmission line nets; however, a bus or transmission line routed parallel to another net may be considered part of the bundle tree.

3.8 Planar Loop Modes and Dimensions

The present invention relates to antennas that are small relative to the wavelength of the radiated signal. In particular, the maximum dimension of the loop should be less than $1/10$ wavelength. In a further embodiment, the maximum dimension of the antenna should be less than $1/100$ wavelength.

The present invention may be useful with near field systems, i.e., system operating with communication distances less than one wavelength, preferably less than one half or more preferably less than one-sixth wavelength.

In one embodiment, the planar loop is constructed without ground or power planes that would obstruct the magnetic field through the center of the coil. A partial obstruction is allowed by incorporating the exclusion zone to allow significant operating magnetic field through the center (i.e., interior) of the coil. The antenna coil is typically operated in a capacitively loaded configuration to resonate at the operating frequency. The resonance effectively utilizes the interior magnetic field to increase coupling between the transmitter and receiver.

3.9 Applications

A variety of applications including Radio Frequency Identification (RFID), low data rate Near-Field Communications (NFC), wireless power transfer, and Real-Time Location Systems (RTLS), can benefit from a planar loop antenna system.

3.9.1 Radio Frequency Identification (RFID) Applications

RFID applications generally prefer a simple antenna solution on an RFID tag so as to minimize tag cost. RFID applications could benefit from the inexpensive planar antenna system incorporating additional diversity from additional co-located antenna elements, thus decreasing orientation dependence. In one embodiment, the three antennas may be multiplexed to a single receiver. In an alternative embodiment, the three antennas may each be connected to a respective receiver. In a further embodiment, the signals to each antenna may receive differing modulation. Additional methods of combining signals from multiple antennas may be implemented by those skilled in the art in accordance with the teachings herein.

3.9.2 Near-Field Communications (NFC) Applications

NFC is a short range communication technology based on magnetic induction. Palermo et al disclosed such a system in their "Short-range magnetic communication system," U.S. Pat. No. 5,771,438. Typical implementations operate at 13.56

MHz in the Industrial Scientific and Medical (ISM) band. NFC links exploit the physics of near-field links to achieve robust, short range links whose privacy is enhanced by the physics of rapid near-field signal roll-off with range. An alternate low frequency data network, similar to NFC, is RuBee (IEEE 1902.1). This system typically operates around 131 kHz, exploiting the superior propagation of low frequency magnetic signals. An example of such a system is the "Radio tag and system," disclosed by Stevens, et al [U.S. Pat. No. 7,321,290]. The planar antenna system of the present invention may be applied to NFC applications in a similar manner as discussed for RFID applications, thus reducing directional dependence and increasing link reliability due to elimination of potential antenna null directions. The planar form factor enables the application of the antenna for small and thin device packaging.

3.9.3 Wireless Power Transfer Applications

Also in recent years there has been interest in wireless power transfer applications—wirelessly beaming power to consumer electronic devices to allow them to recharge their batteries without plugging them in. Although a variety of physical approaches have been proposed ranging from laser to microwave beams, one of the most practical approaches in the context of small consumer electronic devices is the magnetic coupling of energy between a transmitter and a receiver within near-field range. For this application, high efficiency, low cost planar loop antennas would be highly desirable. Additionally, many consumer electronics devices are characterized by a thin form-factor—a design in which a dimension along one axis is substantially shorter than that along one or more other substantially orthogonal axes. The low cost and thin form factor advantages may be utilized by wireless power transfer applications.

3.9.4 Real-Time Location Systems (RTLS) Applications

Applicants have pioneered an RTLS solution. "Near-field electromagnetic ranging" (NFER®) technology offers a wireless physical layer optimized for real-time location in the most RF hostile settings. Near field systems can exploit near-field behavior within about a half wavelength of a tag transmitter to locate a tag to an accuracy of 1-3 ft, at ranges of 60-200 ft, all at an infrastructure cost of $0.50/sqft or less for most installations. Near field systems operate at low frequencies, typically around 1 MHz, and long wavelengths, typically around 300 m. FCC Part 15 compliant, low-power, low frequency tags provide a relatively simple approach to wireless location that is simply better in difficult RF propagation environments like urban or indoor settings.

Low frequency signals penetrate better and diffract or bend around the human body and other obstructions. This physics gives near field systems long range. Near field signals have more structure than observed in the far field. Radial field components provide the near field with an additional property somewhat analogous to polarization, and the electric and magnetic field components are not synchronized as they are for far-field signals. Thus, the near field offers more parameters that may be observed and utilized for tracking information. Also, low-frequency, long-wavelength signals are resistant to multipath. The multipath physics gives near field systems high accuracy. Low frequency hardware is less expensive, and less of it is needed because of the long range. This makes near field systems more economical in more difficult RF environments.

Near field electromagnetic ranging was first fully described in "System and method for near-field electromagnetic ranging" (Ser. No. 10/355,612, filed Jan. 31, 2003 by Schantz et al., now U.S. Pat. No. 6,963,301, issued Nov. 8, 2005).

Complicated propagation environments do tend to perturb the near-field phase relations near field systems rely upon. Techniques for overcoming this problem using calibration methods described in "Near-field electromagnetic positioning system and method" (Ser. No. 10/958,165, filed Oct. 4, 2004, now U.S. Pat. No. 7,298,314, issued Nov. 20, 2007). Additional calibration details are provided in "Near-field electromagnetic positioning calibration system and method" (Ser. No. 11/968,319, filed Nov. 19, 2007, now U.S. Pat. No. 7,592,949, issued Sep. 22, 2009). Still further details of this calibration are provided in co-pending "Near-field electromagnetic positioning calibration system and method" (Ser. No. 12/563,960 filed Sep. 21, 2009 by Schantz et al.

Unique algorithms enable innovative techniques for displaying the probability density and other aspects of location information, as described in "Electromagnetic location and display system and method," (Ser. No. 11/500,660, filed Aug. 8, 2006, by Schantz et al. now U.S. Pat. No. 7,538,715, issued May 26, 2009).

Orthogonal magnetic antennas offer unique advantages for transmission and reception in real-time location systems and elsewhere. Details may be found in "Near-field location system and method," (Ser. No. 11/272,533, filed Nov. 10, 2005 by Schantz et al., now U.S. Pat. No. 7,307,595, issued Dec. 11, 2007). Additional compact antenna designs are shown in co-pending U.S. application titled: "Space efficient magnetic antenna system," Ser. No. 11/473,595, filed Jun. 22, 2006 by Schantz et al., now U.S. Pat. No. 7,755,552 issued Jul. 13, 2010. A compact antenna system in which at least one of the orthogonal magnetic antennas were implemented in a low-cost fashion on a common PCB with associated RF or other electronic devices would be of great value.

Further, the phase properties of near-field signals from orthogonal magnetic and other multiple antenna near-field transmission signals enable additional phase comparison states that can be used for location and communication, as described in co-pending "Multi-state near-field electromagnetic system and method for communication and location," (Ser. No. 12/391,209, filed Feb. 23, 2009 by Schantz et al.).

Near-field electromagnetic ranging is particularly well suited for tracking and communications systems in and around standard cargo containers due to the outstanding propagation characteristics of near-field signals. This application of near field technology is described in "Low frequency asset tag tracking system and method," (Ser. No. 11/215,699, filed Aug. 30, 2005 by Schantz et al., now U.S. Pat. No. 7,414,571, issued Aug. 19, 2008).

Near-field electromagnetic ranging works well in the complicated propagation environments of nuclear facilities and warehouses. An near field system provides the RTLS in a preferred embodiment of co-pending "System and method for simulated dosimetry using a real-time location system" (Ser. No. 11/897,100, filed Aug. 29, 2007 by Schantz et al.). A near field system also provides the real-time location system in a preferred embodiment of co-pending U.S. application titled: "Asset localization, identification, and movement system and method," Ser. No. 11/890,350, filed Aug. 6, 2007 by Schantz et al.

In addition, AM broadcast band signals are found to be characterized by "near field" behavior, even many wavelengths away from the transmission tower. These localized near-field signal characteristics provide the basis for a U.S. application titled: "Signal-of-opportunity location device and method" Ser. No. 12/796,643, filed Jun. 8, 2010 by Schantz et al. Near field signal of opportunity devices would be well-served by a small form factor multiple orthogonal magnetic antenna enabling a compact signal-of-opportunity location device implementation. All of the above listed US patents and patent applications are hereby incorporated herein by reference in their entirety.

Conclusion

Applicants have presented specific applications and instantiations throughout the present disclosure solely for purposes of illustration to aid the reader in understanding a few of the great many implementations of the present invention that will prove useful. Where exemplary ranges are disclosed, it should be understood that subranges within the disclosed ranges are operatively disclosed. It should be understood that, while the detailed drawings and specific examples given describe preferred embodiments of the invention, they are for purposes of illustration only, that the system of the present invention is not limited to the precise details and conditions disclosed, and that various changes may be made therein without departing from the spirit of the invention, as defined by the following claims:

What is claimed is:

1. A planar loop antenna system comprising:
a planar loop antenna comprising: a plurality of mutually coupled loops supported by a planar substrate and connected in series, said plurality of mutually coupled loops being arranged in a common rotation orientation; said planar substrate comprising one or more parallel layers;
an exclusion zone interior to said planar loop antenna on said planar substrate, and said exclusion zone extending normal to a plane of said planar substrate through and including all said parallel layers of said planar substrate and circuitry mounted thereon; said exclusion zone being free of conducting structure; and
at least one conducting structure interior to an inner boundary of said exclusion zone as determined by a projection of said at least one conducting structure and said exclusion zone on a plane parallel to said planar substrate, said at least one conducting structure mounted on or in proximity to said planar substrate.

2. The planar loop antenna system as recited in claim 1, wherein said planar substrate is a multilayer substrate.

3. The planar loop antenna system as recited in claim 1, wherein said exclusion zone includes a ferrite material.

4. The planar loop antenna system as recited in claim 1, wherein said plurality of mutually coupled loops comprise a plurality of metallic traces characterized by a width of each trace, a thickness of each trace, and a horizontal spacing between adjacent traces.

5. The planar loop antenna system as recited in claim 1, wherein said plurality of metallic traces form at least part of said plurality of mutually coupled loops on at least one layer of said substrate and a width characteristic of at least one loop of said plurality of mutually coupled loops is varied as a function of horizontal position of said at least one loop on said substrate.

6. The planar loop antenna system as recited in claim 1, wherein said plurality of metallic traces form at least part of said plurality of mutually coupled loops on at least one layer of said substrate and a spacing characteristic from at least one loop of said plurality of mutually coupled loops to a subsequent loop is varied as a function of horizontal position on said planar substrate of said at least one loop.

7. The planar loop antenna system as recited in claim 1, wherein said plurality of metallic traces form multiple loops of said plurality of loops on each of at least two layers of said planar substrate and said multiple loops on a first layer of said at least two layers are offset horizontally from corresponding loops on a second layer of said at least two layers.

8. The planar loop antenna system as recited in claim 1, wherein said plurality of metallic traces form multiple loops on each of at least two layers of said substrate and at least one loop of a first layer is varied in width as a function of layer from a corresponding loop of a second layer.

9. The planar loop antenna system as recited in claim 1, wherein said plurality of metallic traces form multiple loops on each of at least two layers of said substrate and at least one loop is varied in width as a function of position within a cross section of said planar loop antenna.

10. The planar loop antenna system as recited in claim 1, further including a second magnetic antenna, said second magnetic antenna mutually orthogonal in directional response to said planar loop antenna; said second magnetic antenna coupled to at least one circuit on said planar substrate, said second magnetic antenna having a second length and second width dimension forming a second plane parallel to a plane of said planar antenna and having a second thickness dimension less than said second length dimension and less than said second width dimension, said second thickness dimension perpendicular to said plane of said planar antenna.

11. The planar loop antenna system as recited in claim 10, further including an electric field antenna, said electric field antenna mutually orthogonal in directional response to said planar loop antenna and said second magnetic antenna.

12. The planar loop antenna system as recited in claim 10, further including a third magnetic antenna, said third magnetic antenna mutually orthogonal in directional response to said planar loop antenna and to said second magnetic antenna; said third magnetic antenna coupled to at least one circuit on said planar substrate, said third magnetic antenna having a third length and third width dimension forming a third plane parallel to a plane of said planar antenna and having a third thickness dimension less than said third length dimension and less than said third width dimension, said third thickness dimension perpendicular to said plane of said planar antenna.

13. The planar loop antenna system as recited in claim 1, wherein the at least one conducting structure comprises a circuit or a battery.

14. The planar loop antenna system as recited in claim 13, wherein the circuit includes a ground plane.

15. The planar loop antenna system as recited in claim 13, wherein the circuit is without a ground plane or a direct current power plane, said circuit implementing ground and direct current power as respective nets.

16. The planar loop antenna system as recited in claim 13, wherein the circuit is routed according to a bundle tree structure.

17. The planar loop antenna system as recited in claim 16, wherein said bundle tree structure characterized by one or more of the following:
1) routes occupying a subset of the available board space,
2) unrelated nets parallel routed in a tree formation,
3) nets with longer paths along the tree formation than would be routed by direct point to point if additional existing board space were made available for routing, or
4) additional vias used to create the compact tree pattern vs. the vias that would be used for direct point to point routing if additional existing board space were made available for routing.

18. The planar loop antenna system as recited in claim 16, wherein the circuit is routed using peripheral routing keep out zones to confine routing to said bundle tree structure.

19. A planar loop antenna system comprising:
a planar loop antenna comprising: a plurality of mutually coupled loops supported by a planar substrate and connected in series, said plurality of mutually coupled loops being arranged in a common rotation orientation; said planar substrate having at least two layers;

wherein said plurality of mutually coupled loops comprise a plurality of metallic traces characterized by a width of each trace, a thickness of each trace, and a horizontal spacing between adjacent traces;

said metallic traces forming multiple loops on each of at least two layers of said substrate and at least one loop is varied in width as a function of position within a cross section of said planar loop antenna.

20. The planar loop antenna system as recited in claim 19, further including a second magnetic antenna, said second magnetic antenna mutually orthogonal in directional response to said planar loop antenna; said second magnetic antenna coupled to at least one circuit on said planar substrate, said second magnetic antenna having a second length and second width dimension forming a second plane parallel to a plane of said planar antenna and having a second thickness dimension less than said second length dimension and less than said second width dimension, said second thickness dimension perpendicular to said plane of said planar antenna.

21. The planar loop antenna system as recited in claim 20, further including an electric field antenna, said electric field antenna mutually orthogonal in directional response to said planar loop antenna and said second magnetic antenna.

22. The planar loop antenna system as recited in claim 20, further including a third magnetic antenna, said third magnetic antenna mutually orthogonal in directional response to said planar loop antenna and to said second magnetic antenna; said third magnetic antenna coupled to at least one circuit on said planar substrate, said third magnetic antenna having a third length and third width dimension forming a third plane parallel to a plane of said planar antenna and having a third thickness dimension less than said third length dimension and less than said third width dimension, said third thickness dimension perpendicular to said plane of said planar antenna.

23. The planar loop antenna system as recited in claim 19, wherein said loops are arranged about an exclusion zone on said planar substrate, said exclusion zone being free of any conducting structure.

24. The planar loop antenna system as recited in claim 19, wherein said exclusion zone includes a ferrite material.

25. The planar loop antenna system as recited in claim 19, wherein said exclusion zone is surrounding at least one conducting structure mounted on or in proximity to said planar substrate.

* * * * *